A. J. MICHELIN.
METHOD OF MANUFACTURING VEHICLE WHEELS.
APPLICATION FILED APR. 16, 1920.

1,413,051. Patented Apr. 18, 1922.
2 SHEETS—SHEET 1.

Inventor:
A. J. Michelin
by Wilkinson & Giusta
Attorneys.

UNITED STATES PATENT OFFICE.

ANDRÉ JULES MICHELIN, OF PARIS, FRANCE.

METHOD OF MANUFACTURING VEHICLE WHEELS.

1,413,051. Specification of Letters Patent. Patented Apr. 18, 1922.

Application filed April 16, 1920. Serial No. 374,507.

*To all whom it may concern:*

Be it known that I, ANDRÉ JULES MICHELIN, a citizen of the French Republic, residing at Paris, France, have invented certain new and useful Improvements in Methods of Manufacturing Vehicle Wheels; and I do hereby declare the following to be a full, clear, and exact description of the invention, such as will enable others skilled in the art to which it appertains to make and use the same.

My present invention relates to improvements in the method of manufacturing removable metal wheels adapted to be attached to or removed from hubs of standard or preferred construction, and intended also for use with resilient tires of any standard or preferred type.

The construction of the hub and tire are not a part of my present invention which relates only to the manufacture of a removable web plate and means for connecting the tire thereto, as will be hereinafter more fully described and claimed.

In the manufacture of such wheels it is desirable to have the web plates in the form of an annular cup-shaped member having the bottom of the cup of varying conicity, with the flange on the exterior of the cup forming a support for the rim carrying the tire. It is also desired to form the web plate with decreasing thickness from the center towards the periphery, the result being that a certain amount of resiliency is imparted to the wheel which is not possessed by metal wheels having the webs at right angles to the axis of the hub; and by having the thickness of the web plate tapering from the hub outwards this resiliency is increased, and at the same time the gyroscopic effect of heavy rotating masses carried by the periphery of the wheel is in a measure obviated. By having the elements of the cone curved as shown, instead of straight, greater strength for the same weight of metal is secured near the periphery of the wheel.

In order to construct a wheel having these properties I have devised a method which may be briefly described as follows:

I provide a blank formed of an annular disk of malleable metal, preferably forged steel, which may be rolled either hot or cold, but preferably hot, into an annular plate tapering in thickness from the center towards the periphery; but preferably provided with an annular reinforce around the opening therein to form a bearing for the fastening bolts. This plate may have its outer edges trimmed, if desired, so that the perimeter when completed shall be a true circle. The outer edge of the plate so formed is then bent up, preferably by the use of a die and matrix of a hydraulic press, into a cup-shaped form which may be either in the form of a hollow cylinder with a flat bottom, or the complete final shape may be given to the web plate by forming the bottom of the cup in the form of a truncated cone with its elements slightly curved, and with its edges flanged and curved over to form a seat for the rim carrying the tire, which rim may be shrunk on while hot or fitted cold, and welded or riveted, or otherwise secured in place, as desired.

Incident to the forming process, holes and sockets are cut in the annular reinforced portion of the web plate for the fastening bolts as will be hereinafter described.

After the web plate has been completed, and the rim put on, the tire is applied, and the whole constitutes a removable wheel which may be applied to a hub of standard or preferred construction, as will be hereinafter more fully described.

My invention will be more fully understood after reference to the accompanying drawings, in which like parts are indicated by similar reference symbols throughout the several views, and in which:—

Figure 1:
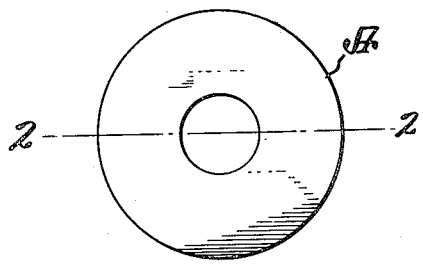
Figure 1 represents an annular blank used in forming the cup-shaped web plate.
Figure 2:
Figure 2 shows a section along the line 2—2 of Figure 1.

A represents the blank shown in Figures 1 and 2 which is rolled, preferably while hot, by a suitable rolling mill, such, for instance, as shown diagrammatically in Figure 9, to the form shown in Figures 3 and 4, in which 1 shows an annular portion surrounding the opening 2, having plain faces, which portion remains of the original thickness of the blank and forms a reinforced mass to which the fastening bolts are attached, as will be hereinafter described.

Figure 4:
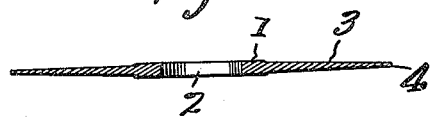
Figure 4 shows a section along the line 4—4 of Figure 3, and looking in the direction of the arrows.

The outer portion of the blank is rolled tapered, as at 3, see Figure 4, and if the perimeter 4 does not form a true circle it may be conveniently machined to such form if desired.

Figure 3:
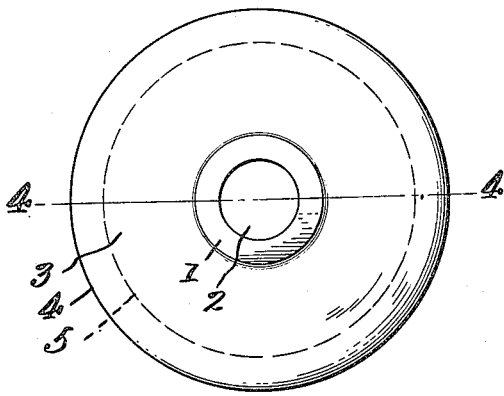
Figure 3 shows the annular disk after it has been rolled out to the desired cross section, but before bending up the flanges.
Figure 5:
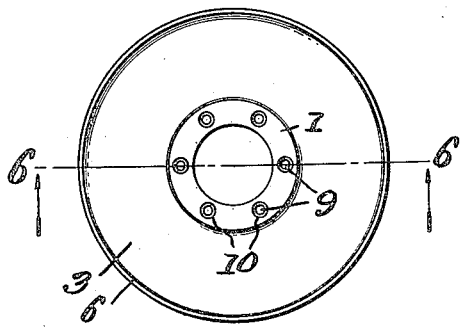
Figure 5 shows the rolled plate of Figure 4, after the flange has been bent up along the dotted circle 5 of Figure 4 to form a cylindrical cup.
Figure 6:
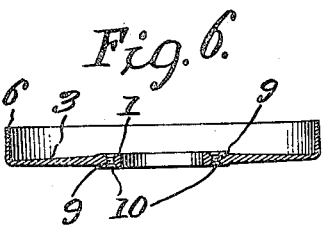
Figure 6 shows a section along the line 6—6 of Figure 5, and looking in the direction of the arrows.

After being rolled to the shape shown in Figure 4, the blank is formed into a shallow annular cup, as shown in Figures 5 and 6, by flanging up the edges of the blank shown in Figure 3 along the circular broken line 5 of said figure, thus forming a flange 6, as shown in Figures 5 and 6. This shape of the blank, as shown in Figures 5 and 6, may be accomplished by using the die and matrix of a hydraulic or power driven press of suitable type.

Figure 7:
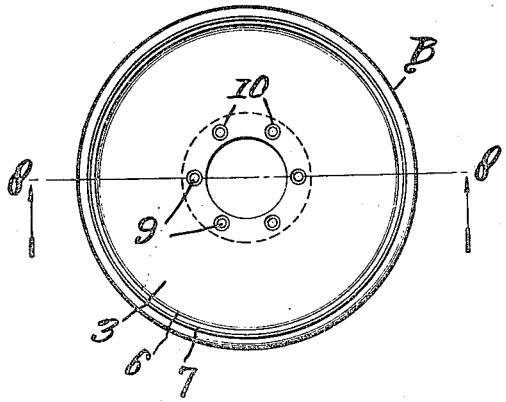
Figure 7 is a similar view to Figure 6, but shows the web plate after the tire holding rim has been attached, and the conical portion of the web plate shaped to curve slightly.
Figure 8:
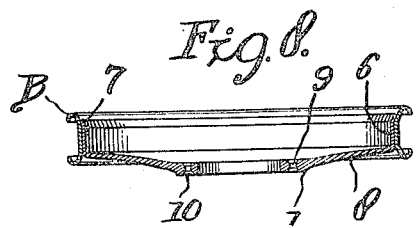
Figure 8 shows a section along the line 8—8 of Figure 7, and looking in the direction of the arrows.

After the blank has been formed to the shape shown in Figure 6, it may be further formed in the press to the final shape shown in Figures 7 and 8, in which the flange 6 is still further bent out, as at 7, and the tapered web 3 is dished to form a cone having a large angle, the elements of which cone are preferably curved, as at 8. Instead of shaping the blank into the form shown in Figures 6 and 8 in two operations, the same may be accomplished at a single operation with a press having a suitably shaped die and matrix, if desired; but I have shown the operation as made in two separate steps, as more clearly illustrating the process to which the blank is subjected in the operation of forming the wheel.

At any convenient stage of the operation, the bolt holes 9 are punched or drilled out of the reinforced portion 1 of the blank, and these bolt holes are preferably enlarged at each end to form conical sockets 10 to engage the bosses on the securing bolts and nuts which are used in assembling the wheel, as will be hereinafter described.

After the blank has been formed to the proper shape to constitute the dished web plate shown in Figure 8, the metal rim B is secured on. This rim, while shown of the clincher type, may be of any suitable or preferred type, and is preferably made of slightly smaller internal diameter than the exterior surface of the flange of the web plate, and is heated and shrunk on to the web plate, being further secured in place, if desired, by welding, riveting, or in any other convenient way. The rim may also be fitted, when cold, on to the web plate.

Figure 10:
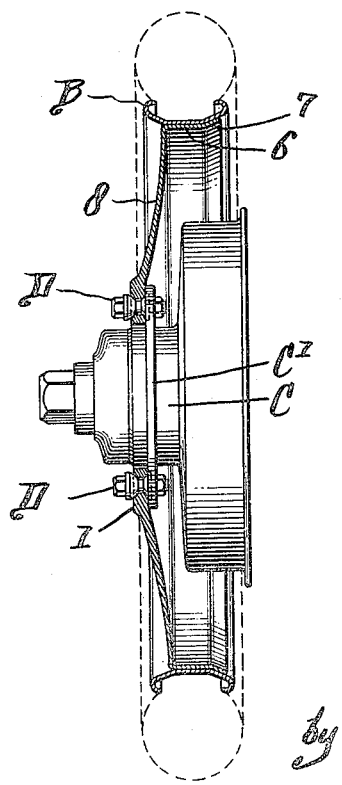
Figure 10 is a sectional view, showing the hub in elevation, the web plate and rim in section, and the tire in dotted lines, and illustrates the complete wheel with all the parts assembled.

When the rim is thus attached to the web plate the two form the removable metal part of the wheel shown in Figure 8, and the tire shown in dotted lines in Fig. 10 may be put on the rim in any convenient way; the whole then constituting a removable wheel adapted to be attached to or removed from the hub.

For attaching this wheel to the hub I provide on the hub C, which may be of standard or preferred make, a fixed annular collar C' to which the web plate is attached by means of the bolts and nuts D.

The complete wheel and the mode of assembling the same are illustrated and described in my co-pending applications both executed of even date herewith, filed April 16, 1920, Serial Nos. 374,505 and 374,506, and entitled, respectively, Improvements in vehicle wheels, Cases "A" and "B," and the practical operation and use of the wheels will not be further described, as my present invention relates purely to the mode of manufacturing the wheel, or the metal portions thereof which are removably mounted on the hub.

Figure 9:
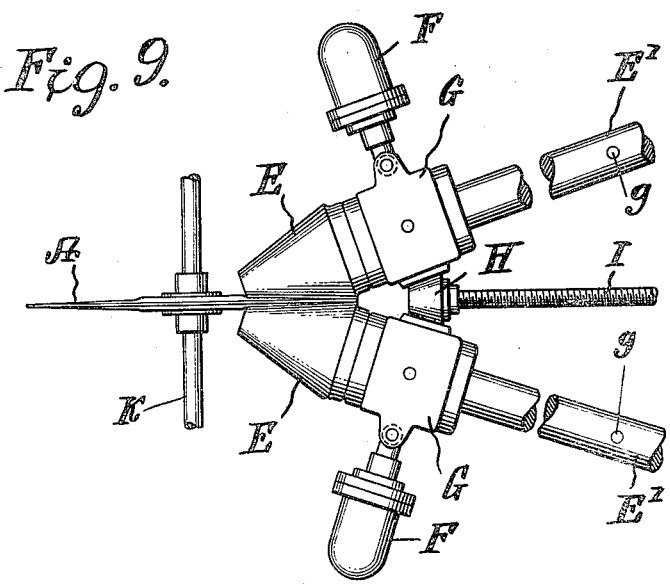
Figure 9 shows diagrammatically a convenient mode of rolling the blank from the shape shown in Figure 1 to the shape shown in Figure 3.

Any suitable means for rolling the annular disk-shaped blank to the tapered form may be used, such, for instance, as are shown diagrammatically in Figure 9, in which E—E are conical rollers of the special rolling mill, which are driven in any convenient way by the shafts E'—E'. These rollers are pressed together hydraulically or mechanically, as, for instance, by means of the hydraulic rams F—F. The journal bearings G—G on the rollers E—E pivot about the points g—g, and the conical spacing roller H engages between these bearings and is mounted on the end of a screw I, by means of which said spacing roller may be moved forwards or drawn back, thus varying the distance of the rollers E—E.

The steel disk A is mounted on a shaft K (see Fig. 9), which may be moved towards or away from the rollers E—E by any suitable means, not shown, and this shaft is free to rotate in bearings not shown. This forms a convenient mode of rolling the annular blank to the tapered form, but other means may be adopted if desired, and I do not mean to limit the invention to any special means for tapering the blank, or for cupping the same, or for finally shaping the same, as various means well known in the art may be used for accomplishing all of these various purposes.

It will be obvious that various modifications might be made in the herein described method, and in the various steps incident to the same, which might be used without departing from the spirit of my invention; and I do not mean to limit the invention to such details, except as particularly pointed out in the claims.

Having thus described my invention what I claim and desire to secure by Letters Patent of the United States is:—

1. The method of forming a web plate for use with removable wheels for vehicles, which consists in forming an annular disk-shaped blank with flat parallel sides, rolling this blank to form a plate tapering in thickness from its center to its periphery, pressing up the peripheral portion of this blank to form an annular flange, and finally dishing the annular plate inside of said flange, and providing bolt holes therein.

2. The method of forming a web plate for use with removable wheels for vehicles, which consists in forming an annular disk-shaped blank with flat parallel sides, rolling this blank to form a plate tapering in thickness from its center to its periphery, pressing up the peripheral portion of this blank to form an annular flange, dishing the annular plate inside of said flange to form a hollow truncated cone having its elements curved, and providing bolt holes in said plate.

3. The method of forming a web plate for use with removable wheels for vehicles, which consists in forming an annular disk-shaped blank with flat parallel sides, rolling this blank to form a plate having a thick annular central portion, and tapering in thickness from said central portion to its periphery, pressing up the peripheral portion of this blank so rolled to form an annular flange, dishing the annular plate inside of said flange, and providing bolt holes in the thick central portion.

4. The method of forming a web plate for use with removable wheels for vehicles, which consists in forming an annular disk-shaped blank with flat parallel sides, rolling this blank to form a plate having a thick annular central portion, and tapering in thickness from said central portion to its periphery, pressing up the peripheral portion of this blank so rolled to form an annular flange, dishing the annular plate inside of said flange, to form a hollow truncated cone having its elements curved, and providing bolt holes in said plate.

5. The method of forming a combined web plate and rim for use in removable wheels for vehicles, which consists in forming an annular disk-shaped blank with flat parallel sides, rolling this blank to form a plate tapering in thickness from its center to its periphery, pressing up the peripheral portion of this blank to form an annular flange, shaping said flange to form a seat for the rim, dishing the annular plate inside of said flange, providing bolt holes in said plate for the fastening nuts, and finally securing an annular metal rim adapted to hold a tire on the exterior of said flange.

6. The method of forming a combined web plate and rim for use in removable wheels for vehicles, which consists in forming an annular disk-shaped blank with flat parallel sides, rolling this blank to form a plate tapering in thickness from its center to its periphery, pressing up the peripheral portion of this blank to form an annular flange, shaping said flange to form a seat for the rim, dishing the annular plate inside of said flange, providing bolt holes in said plate for the fastening nuts, and finally shrinking an annular metal rim adapted to hold a tire on the exterior of said flange, and securing said rim on said flange.

7. The method of forming a combined rim and web plate for use with removable wheels for vehicles, which consists in forming an annular disk-shaped blank with flat parallel sides, rolling this blank to form a plate having a thick annular central portion, and tapering in thickness from said central portion to its periphery, pressing up the peripheral portion of this blank so rolled to form an annular flange, dishing the annular plate inside of said flange, providing bolt holes in the thick central portion of said plate, and securing an annular metal rim over said annular flange.

8. The method of forming a combined rim and web plate for use with removable wheels for vehicles, which consists in forming an annular disk-shaped blank with flat parallel sides, rolling this blank to form a plate having a thick annular central portion, and tapering in thickness from said central portion to its periphery, pressing up the peripheral portion of this blank so rolled up to form an annular flange, dishing the annular plate inside of said flange, to form a hollow truncated cone having its elements curved, providing bolt holes in said plate, and securing an annular metal rim over said annular flange.

9. A web plate for use with removable wheels for vehicles, comprising an annular cup-shaped plate tapering in thickness from its center to its periphery, with its peripheral portion bent to form an annular flange, the portion of the annular plate inside of said flange being dished and provided with bolt holes therein.

10. A web plate for use with removable wheels for vehicles, comprising an annular cup-shaped plate tapering in thickness from its center to its periphery, with its peripheral portion bent to form an annular flange, adapted to support a tire holding rim, the portion of the annular plate inside of said flange being dished to form a hollow truncated cone having its elements curved, said plate being provided with bolt holes therein.

In testimony whereof, I affix my signature.

ANDRÉ JULES MICHELIN.